No. 632,196. Patented Aug. 29, 1899.
C. OHAVEN & F. P. UHRIG.
HARROW.
(Application filed Apr. 28, 1897.)
(No Model.)
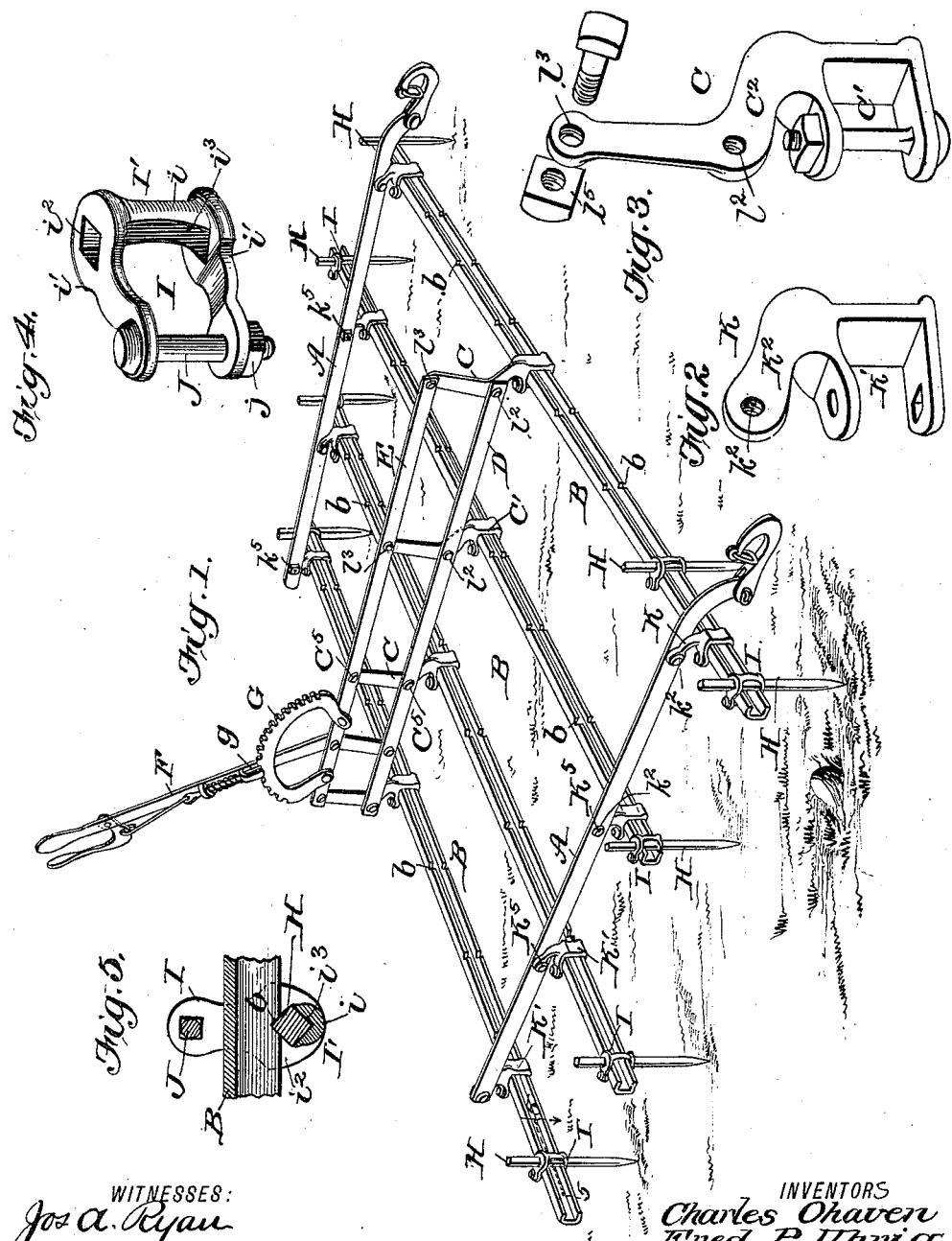
WITNESSES:
Jos A. Ryan
P. B. Turpin
INVENTORS
Charles Ohaven
Fred P. Uhrig.
BY
Munn & Co.
ATTORNEYS.
THE NORRIS PETERS CO., PHOTO-LITHO., WASHINGTON, D. C.

UNITED STATES PATENT OFFICE.

CHARLES OHAVEN AND FRED P. UHRIG, OF FORT MADISON, IOWA; SAID UHRIG ASSIGNOR TO SAID OHAVEN.

HARROW.

SPECIFICATION forming part of Letters Patent No. 632,196, dated August 29, 1899.

Application filed April 28, 1897. Serial No. 634,198. (No model.)

*To all whom it may concern:*

Be it known that we, CHARLES OHAVEN and FRED P. UHRIG, of Fort Madison, in the county of Lee and State of Iowa, have invented a new and useful Improvement in Harrows, of which the following is a specification.

Our invention is an improvement in harrows; and it consists in certain novel constructions and combinations of parts, as will be hereinafter described, and pointed out in the claim.

In the drawings, Figure 1 is a perspective view of a harrow provided with our improvements. Fig. 2 illustrates one of the end hinges in detail. Fig. 3 illustrates one of the central or adjusting hinges in detail. Fig. 4 illustrates one of the tooth-holders in detail, and Fig. 5 is a detail horizontal section.

The harrow has the draft-bars A, the tooth-bars B, hinged to the draft-bars, the adjusting-hinges C, which connect the tooth-bars with the parallel bars D and E, the lever F, connecting said parallel bars, and the rack G and pawl $g$, constituting a detent by which the bars D and E may be held in position to secure the teeth at any desired inclination.

The tooth-bar B is channeled and has in its edges notches $b$, forming seats for the tooth H. The tooth-holders I, of which we employ one for each tooth, are formed with loops I' to embrace the tooth-bar and tooth and clamp the latter tightly to its seat.

In the construction shown the holder or clip-guard has the solid front or clamp bar $i$ and the arms $i'$, perforated at $i^2$ for the tooth, the clamp-bar being grooved or recessed in its rear side at $i^3$ in line with the perforations $i^2$ to receive the tooth. The arms $i'$ are curved slightly to conform to the shape of the channeled tooth-bar and are connected by the clamp-bolt J, whose nut $j$ may be tightened to clamp the tooth tightly in place by the curved parts of the arms when drawn together upon the tooth-bar operating to bind the tooth strongly against the edges of the tooth-bar, as will be understood from Fig. 4.

The end hinges K and adjusting-hinges C are formed with loops K' and C', embracing and clamped to the tooth-bars, in like manner to the loops I' of the tooth-holders I, and support the brackets $K^2$ and $C^2$, the former being pivoted at $k^2$ to the draft-bars A and the latter being pivoted at $l^2$ $l^3$, respectively, to the bars D and E. The loops I', K', and C' constitute fastening-loops, the first for securing the tooth and the last two for securing the hinge-sections and in certain features are the same in construction.

It will be seen that the channeled bars are free of bolt-holes, and thus retain their entire strength, and also that the notch in which the tooth is seated prevents the tooth from working sidewise.

In pivoting the hinge-brackets $K^2$ and $C^2$ it is preferred to thread the holes therein for the pivot-bolts $K^5$ and $C^5$ and thread the latter in said holes and fit lock-nuts $k^5$ and $l^5$ on their ends.

In practice the fastening-loops of the hinges and tooth-holders are made of malleable iron, so they can be spread when their bolts are taken out, so any of such loops can be taken off the channeled tooth-bar independent of the others, and each tooth can be driven through the tooth-holder at any desired length.

It will be seen that our clip-guard is so constructed as to clip square, angled, round, U-shaped, or V-shaped bars and is arranged to strengthen the bar instead of weakening it, which is the result where holes are drilled for the reception of the tooth-holders.

Our clip-guard has a solid upright front, recessed in its rear side for the reception of the tooth and strengthens and holds the tooth fast in its place, the clip-guard being drawn together by means of a bolt and nut at the back of the bar, the bolt passing through holes in the arms of the clip.

Our device differs from tooth-holders made of two pieces and bolted together at the back of bar, as these give an opportunity to the clip to spring from its work and loosen the tooth.

Having thus described our invention, what we claim as new, and desire to secure by Letters Patent, is—

The clip-guard harrow-tooth holder having a solid front recessed for the reception of the tooth and adapted at the same time to strengthen and hold the tooth fast in its place, the clip-guard being drawn together by means of bolt and nut at the back of the bar through holes made for the bolt in the ends of the clip combined with the bar, tooth and bolt substantially as described.

CHARLES OHAVEN.
FRED P. UHRIG.

Witnesses:
TANJORE T. HITCH,
JOSEPH M. CASEY.